(12) United States Patent
Wakefield

(10) Patent No.: US 8,640,654 B2
(45) Date of Patent: Feb. 4, 2014

(54) ATTACHMENT FOR FENCE SYSTEM AND METHOD OF USE

(76) Inventor: Kenneth Wakefield, Dallas, TX (US)

( * ) Notice: Subject to any disclaimer, the term of this patent is extended or adjusted under 35 U.S.C. 154(b) by 134 days.

(21) Appl. No.: 13/306,248

(22) Filed: Nov. 29, 2011

(65) Prior Publication Data

US 2013/0133590 A1    May 30, 2013

(51) Int. Cl.
*A01K 15/00* (2006.01)
*E04H 17/00* (2006.01)

(52) U.S. Cl.
USPC ............................................. 119/712; 256/1

(58) Field of Classification Search
USPC ............................................. 256/1; 119/712
IPC ..................................................... A01K 15/00
See application file for complete search history.

(56) References Cited

U.S. PATENT DOCUMENTS

| 4,070,006 A * | 1/1978 | Storie ................................ 256/1 |
| 4,327,910 A * | 5/1982 | Mackie ........................ 273/452 |
| 5,354,051 A * | 10/1994 | Fehrenbach et al. .......... 473/434 |
| 2002/0190248 A1* | 12/2002 | Ohai ................................ 256/64 |
| 2008/0230758 A1* | 9/2008 | Reinert ............................. 256/1 |

* cited by examiner

*Primary Examiner* — Kimberly Berona
(74) *Attorney, Agent, or Firm* — The Law Office of Jerry D. Haynes

(57) ABSTRACT

An attachment and method for a fence system to prevent a pet from escaping a fenced comprising at least one first support member adapted to be attached substantially horizontally to at least a portion of the fence system, a plurality of second support members adapted to be attached substantially vertically to the at least one first support member, and a plurality of inserts adapted to be received within the plurality of second support members. Each of the plurality of inserts is capable of extending out of a lower portion of the each of the plurality of second support members upon digging the fenced area by the pet animal such that the extended plurality of inserts block the dug area to prevent the pet animal from escaping the fenced area.

5 Claims, 2 Drawing Sheets

ATTACHMENT FOR FENCE SYSTEM AND METHOD OF USE

FIELD OF THE INVENTION

The present invention generally relates to a fence system, and, more particularly, to an attachment for a fence system and method capable of preventing a pet animal from escaping a fenced area.

BACKGROUND OF THE INVENTION

Fence systems for enclosing an area, such as a surrounding of a house, a garden or lawn and the like are well known in the art. The installation of fence systems protects intruders from entering the area. Moreover, the fence systems allow safe confinements of pet animals within the fenced area.

Often, pet animals, such as dogs, cats and the like, tend to dig underneath the boundary of the fenced area, thereby creating a hole for escaping out therefrom. Accordingly, such fence systems may not be efficient enough to confine the pet animal (hereinafter referred to as a pet) within the fenced area. The escape of the pet from the fenced area may compel an owner of the pet to search for the pet, which is a time consuming and stressful task.

Upon escaping out of the fenced area, the pet may roam outside the area and cause safety problems for the public and other animals. For example, the roaming pets may get involved in a territorial dispute with other animals, leading to an animal fight which may injure the pet and the public. Further, the owner of the escaped pet may be subject to civil or criminal sanctions in the instance that the pet is creating a problem or scaring the public outside of the fenced area. Also, there is the possibility that a pet may become lost and/or injured after leaving the fenced area.

Accordingly, there exists a need for preventing a pet animal from escaping a fenced area. Additionally, there exists a need for enabling a pet owner to readily detect the escape of the pet animal from the fenced area.

SUMMARY OF THE INVENTION

In view of the foregoing disadvantages inherent in the prior art, the general purpose of the present invention is to provide an attachment for a fence system, configured to include all the advantages of the prior art, and to overcome the drawbacks inherent therein.

The present invention, relates to an attachment for a fence system. The attachment is capable of preventing a pet animal from escaping the fenced area. The attachment comprises at least one first support member, a plurality of second support members, and a plurality of inserts. The at least one first support member is adapted to be attached substantially horizontally to at least a portion of the fence system. The plurality of second support members is adapted to be attached substantially vertically to the at least one first support member such that a lower portion of each of the plurality of second support members is supported on a ground level of the fenced area. Each of the plurality of second support members is configured to assume a hollow configuration. Each of the plurality of inserts is adapted to be received within a second support member of the plurality of second support members. Moreover, each of the plurality of inserts extends out of the lower portion of the plurality of second support members upon digging out or around the fenced area by the pet animal. The extended plurality of inserts is capable of blocking the dugout area to prevent the pet animal from escaping the fenced area. The plurality of inserts descend progressively as dirt is removed from the under the insert. The inserts prevent a pet from escaping under the fence.

In another aspect of the present invention the attachment for the fence system further comprises a fastening mechanism for attaching the at least one first support member to the portion of the fence system.

In yet another aspect of the present invention, a color of the plurality of second support member is distinct from a color of the plurality of the inserts for enabling a pet owner to readily detect the escape of the pet animal by the color of extended inserts of the plurality of inserts.

These together with other aspects of the present invention, along with the various features of novelty that characterize the invention, are pointed out with particularity in the claims annexed hereto and form a part of this invention. For a better understanding of the invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

The present invention relates to an attachment for a fence system to prevent a pet animal from escaping a fenced area. Specifically, the attachment of the present invention is capable of being installed on an existing fence system for preventing the pet animal, such as a dog, from escaping the fenced area.

Figure 1:
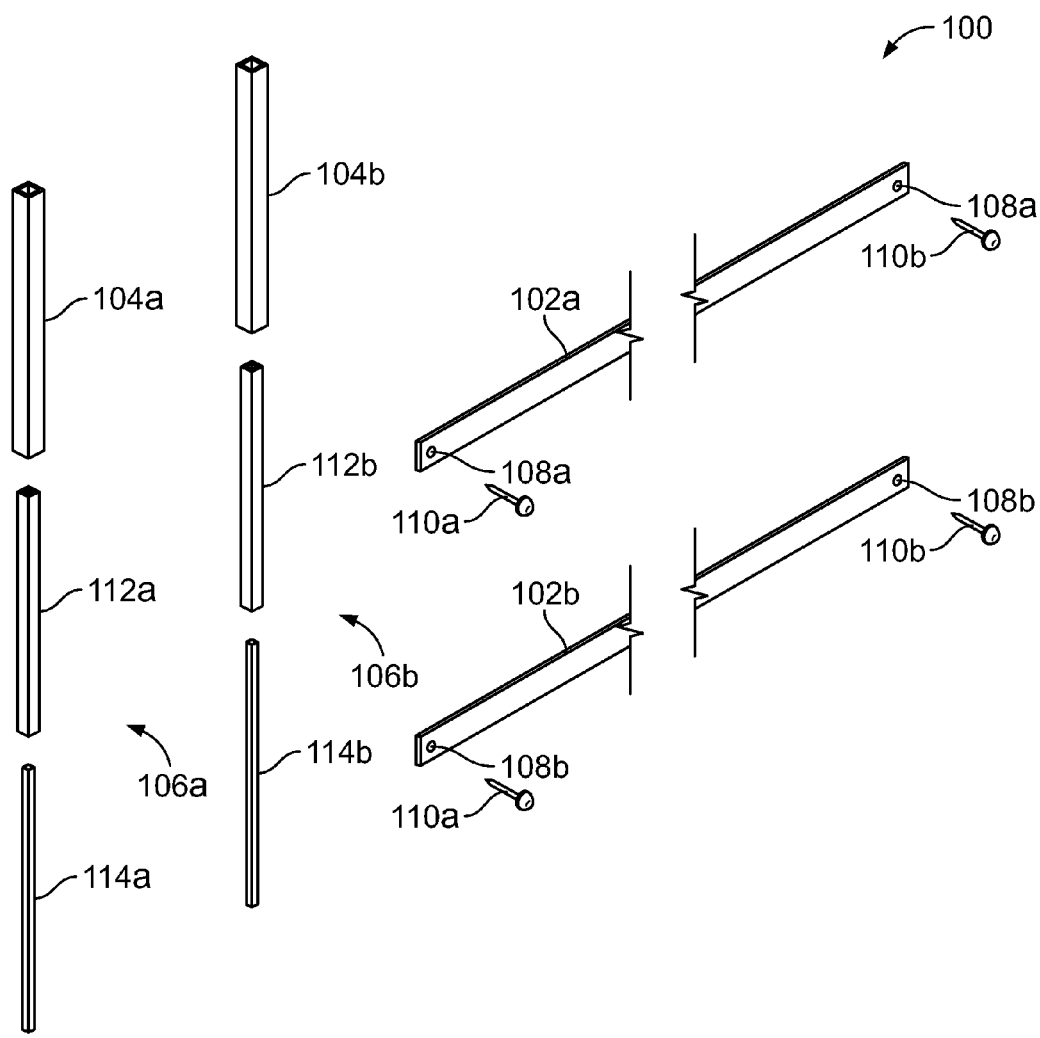
FIG. 1 illustrates an exploded perspective view of an attachment for a fence system, in accordance with an exemplary embodiment of the present invention.

Referring to FIG. 1, an exploded perspective view of an attachment 100 for a fence system (not shown) is illustrated, in accordance with an exemplary embodiment of the present invention. The attachment 100 includes at least one first support member, such as a first support member 102a and a first support member 102b, a plurality of second support members, such as a second support member 104a and a second support member 104b, and a plurality of inserts, such an insert 106a and an insert 106b.

The at least one first support member, such as the first support member 102a and the first support member 102b is adapted to be attached substantially vertically to at least a portion of the fence system. As illustrated and disclosed herein, the at least one first support member includes two first support members, namely the first support member 102a and the first support member 102b (hereinafter collectively referred to as first support members 102). However, it will be evident to a person skilled in the art that the at least one first support member may include fewer or more number of the first support members based on the application and requirement thereof The first support members 102 may assume an elongated rectangular strip like structure. With reference to FIG. 1, the first support members 102 are shown with a broken intermediate portion for illustrating that the first support members 102 includes a substantial length, based on a length of the attachment 100. The term "length" used herein refers to a portion of the fence system to be installed with the attachment 100. Each of the first support members 102 may include two holes, such as a hole 108a and a hole 108b (hereinafter collectively referred to as holes 108), configured at the end portions of the first support members 102. The holes 108 facilitate attachment of the first support members 102 to the portion of the fence system with the help of a fastening mechanism.

In the present embodiment, the fastening mechanism includes a plurality of screws, such as a screw 110a and a screw 110b (hereinafter collectively referred to as a plurality of screws 110). However, it will be evident to a person skilled in the art that the fastening mechanism may include other fastening means apart from the plurality of screws 110, such as a plurality of nails, a plurality of rivets, and a nut-bolt arrangement. Further, the holes 108 are capable of receiving a plurality of screws 110 for coupling the first support members 102 to the fence system. For example, the holes 108a and 108b may receive the screws 110a and 110b, respectively, therein for coupling the first support members 102 to the fence system.

The plurality of second support members, such as the second support members 104a and 104b (hereinafter collectively referred to as a plurality of the second support members 104) is adapted to be attached to the first support members 102. The plurality of second support members 104 is attached substantially vertically to the first support members 102.

In one embodiment of the present invention, the plurality of second support members 104 is attached to the first support members 102 by a process of welding. However, it will be evident to a person skilled in the art that the plurality of second support members 104 may be attached to the first support members 102 by other attaching means, such as a plurality of rivets, and a nut-bolt arrangement. For the sake of brevity of the description, the plurality of second support members 104 is shown to include only two second support members 104a and 104b. However, it will be evidence to a person skilled in the art that the attachment 100 may include a multitude of second support members.

Further, the plurality of second support members 102 in a manner such that adjacent second support members of the plurality of second support members 104 are spaced apart by a predetermined distance. The term "predetermined distance" used herein refers to a distance that needs to be maintained between the second support members, based on a size of a pet animal to be restricted with the help of the attachment 100 of the present invention. More specifically, based on the size of the pet animal, the predetermined distance between the adjacent second support members, may be altered while attaching the plurality of second support members 104 to the first support members 102.

As disclosed herein, each of the plurality of second support members 104 is configured to assume an elongated tube-like hollow configuration having a rectangular cross-section. However, it will be evident to a person skilled in the art that the plurality of second support members 104 may be configured to have any other cross-section, such as a circular cross-section, an oval cross-section, and other polygonal cross-section.

The plurality of second support members 104 are adapted to receive the plurality of inserts, such the insert 106a and the insert 106b (hereinafter collectively referred to as a plurality of inserts 106) therein. More specifically, each insert of the plurality of inserts 106 is adapted to be received within a second support member of the plurality of second support members 104, due to the hollow configuration of the plurality of the second support members 104. For example, the inserts 106a and 106b are capable of being received by the second support members 104a and 104b, respectively. Additionally, in such an instance, a cross-sectional area of an insert of the plurality of inserts 106 is smaller as compared to a cross-sectional area of a second support member of the plurality of second support members 104.

For the sake of brevity, the attachment 100 has been explained herein with reference to two inserts, namely the insert 106a and the insert 106b. However, it will be evident to a person skilled in the art that the attachment 100 may include more than two inserts having structural configuration and functionality similar to that of the inserts 106a and 106b.

Each insert of the plurality of inserts 106 is adapted to extend out from a lower portion of a second support member, such as the second support member 104a of the plurality of second support members 104. In one embodiment of the present invention the each insert of the plurality of inserts 106 includes a first insert and a second insert. More specifically, the insert 106a includes a first insert 112a capable of being telescopically received by the second support members 104a, and a second insert 114a capable of being telescopically received by the first insert 112a. Similarly, the insert 106b includes a first insert 112b capable of being telescopically received by the second support members 104b, and a second insert 114b capable of being telescopically received by the first insert 112b. Accordingly, second inserts, such as the second inserts 114a and 114b (hereinafter collectively referred to as second inserts 114) are capable of extending from the first inserts, such as the first inserts 112a and 112b (hereinafter collectively referred to as second inserts 112) for preventing the pet animal from escaping the fenced area, once the attachment 100 of the present invention is installed on the fence system. The installation of the attachment 100 of the present invention is further explained in detail in conjunction with FIG. 2. The first inserts 112 are configured to assume a hollow configuration, such that the first inserts 112 are capable of receiving the second inserts 114 therewithin. Further, a cross-sectional area of the second inserts 114 may be smaller as compared to a cross-sectional area of the first inserts 112.

Figure 2:
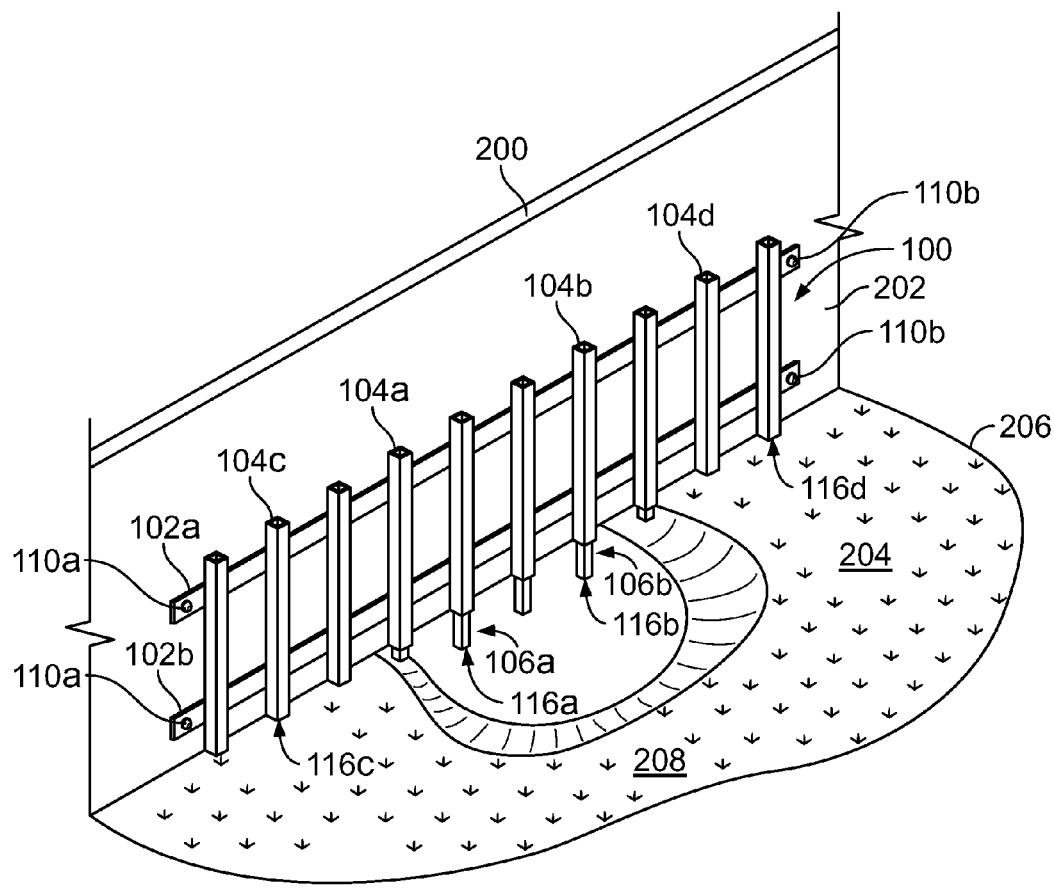
FIG. 2 illustrates an environment in which the attachment of FIG. 1 for the fence system is utilized, in accordance with an exemplary embodiment of the present invention.

Referring now to FIG. 2, an environment in which the attachment 100 is utilized is illustrated, in accordance with an exemplary embodiment of the present invention. More specifically, FIG. 2 illustrates the attachment 100 being installed on a fence system 200, such as a fence surrounding a home. Further, as explained herein, the first support members 102 are adapted to be attached to the portion of the fence system. In the present embodiment, the first support members 102 are attached substantially horizontally to a portion 202 of the fence system 200. More specifically, the plurality of the screws 110 facilitates attachment of the first support members 102 to the portion 202 of the fence system 200.

Further, the plurality of second support members 104 is attached substantially vertically to the first support members 102 in a manner such that a lower portion of each of the plurality of second support members 104 abuts a ground level 204 of a fenced area 206. More specifically, as shown in FIG. 2, lower portions 116c and 116d of second support members 104c and 104d, respectively, abuts the ground level 204 of the fenced area 206. In such an instance, inserts (not shown) received within the second support members 104c and 104d may be also supported on the ground level 204 of the fenced area 206.

The plurality of inserts 106 is further adapted to extend from the plurality of second support members 104 upon digging out or around the fenced area 206 by the pet animal, such that extended plurality of inserts may move downwards, thereby blocking the dug-out area, such as a below ground level area 208 to prevent the pet animal from escaping the fenced area 206. More specifically, as shown in FIG. 2, the inserts 106a and 106b extend out of lower portions 116a and 116b, respectively, of the second support members 104a and 104b for blocking the dug area 208. The inserts 106a and 106b automatically move downward from the second support members 104a and 104b due to the hollow configuration of the second support members 104a and 104b. Accordingly, the extended inserts, such as the inserts 106a and 106b, enable in blocking the below ground level area 208 and thereby prevent the pet animal from escaping the fenced area 206. Further, in one embodiment of the present invention, the first inserts 112 of the plurality of inserts 106 extend out of the plurality of second support members 104 for blocking the dug-out area 208. Further, the second inserts 114 of the plurality of inserts 106 may extend out of the first inserts 112, once the first inserts 112 completely extend out of the plurality of second support members 104, for blocking the dug-out area 208.

In one embodiment of the present invention, the plurality of second support members 104 and the plurality of inserts 106 are adapted have distinct colors. More specifically, a color of the plurality of second support members 104 and a color of the plurality of inserts 106 is adapted to be distinct for differentiating the plurality of second support members 104 from the plurality of inserts 106. For example, the plurality of second support members 104 may have a black color and the plurality of inserts 106 may have a red color. The distinct colors of the plurality of second support members 104 and the plurality of inserts 106 enables in indicating that the pet animal has built the dug area 208. Accordingly, an owner of the pet animal may fill the dug area 208 for repairing the fenced area 206.

Further, in one embodiment of the present invention, the various components, such as the first support members 102, the plurality of second support members 104, and the plurality of inserts 106, of the attachment 100 may be composed of at least one of the steel material, and an aluminum material.

The attachment, as explained herein in conjunction with FIGS. 1 and 2, may be easily installed on an existing fence system. Further, the attachment of the present invention provides a cost effective solution for preventing a pet animal from escaping a fenced area. Additionally, the attachment of the present invention enables in providing safety to the pet animal and public by preventing the pet animal from escaping the fenced area.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the claims of the present invention.

What is claimed is:

1. An attachment for a fence system to block any opening below ground level along the length of the fence system, the attachment comprising:
    at least one first support member adapted to be attached substantially horizontally to at least a portion of the fence system;
    a plurality of second support members adapted to be attached substantially vertically to the at least one first support member such that a lower portion of each of the plurality of second support members abuts a ground level adjacent to the fence system, wherein each of the plurality of second support members is configured to assume a hollow configuration; and
    a plurality of inserts, each insert of the plurality of inserts being adapted to be received within each second support member of the plurality of second support members and where each insert remains in a first position at ground level,
    wherein each of the plurality of inserts descend downwardly out of the lower portion of the each of the plurality of second support members as soil is removed under the insert moving to a variable second position below ground level, the extended plurality of inserts capable of blocking any opening below ground level, and each insert of the plurality of inserts comprises:
    a first insert capable of being telescopically received within the second support member of plurality of second support members; and a second insert capable of being telescopically received within the first insert, wherein the first insert is adapted to descend downward from the lower portion of the second support member and the second insert is adapted to descend out from the first insert to prevent the pet animal from escaping the fenced area.

2. The attachment according to claim 1, wherein a color of the plurality of second support members and a color of the plurality of inserts are distinct.

3. The attachment according to claim 1, further comprising a fastening mechanism for attaching the at least one first support member to the at least apportion of the fence system.

4. The attachment according to claim 3, wherein the fastening mechanism comprises at least one of a plurality of screws, a plurality of nails, a plurality of rivets, and a nut-bolt arrangement.

5. A method of preventing a pet animal from escaping a fenced area, the attachment comprising the steps of:
    attaching at least one first support member to at least a portion of the fence system, where the at least one first support member is adapted substantially horizontally to the fence system;
    vertically attaching a plurality of second support members to the at least one first support member such that a lower portion of each of the plurality of second support members abuts a ground level of the fenced area, wherein each of the plurality of second support members is configured to assume a hollow configuration; and
    inserting an insert within each second support member and where each insert remains in a first position at ground level and said insert descends downwardly out of the lower portion of the second support member as soil is removed under the insert moving to a variable second position below ground level; and
    blocking any opening below ground level while the insert is in the variable second position.

* * * * *